United States Patent
Wirtanen

[11] 3,981,588
[45] Sept. 21, 1976

[54] MEANS AND METHOD FOR DETERMINING MERIDIAN LOCATION AND AZIMUTH

[75] Inventor: Theodore E. Wirtanen, Chelmsford, Mass.

[73] Assignee: The United States of America as represented by the Secretary of the Air Force, Washington, D.C.

[22] Filed: Aug. 5, 1974

[21] Appl. No.: 494,936

[52] U.S. Cl. .................................. 356/152; 33/268; 250/203 R; 356/141
[51] Int. Cl.² .................. G01B 11/26; G01C 17/34
[58] Field of Search ........................... 356/141, 152; 250/203 R; 33/268

[56] References Cited
UNITED STATES PATENTS

| | | | |
|---|---|---|---|
| 3,521,071 | 7/1970 | Speller | 356/152 |
| 3,571,567 | 3/1971 | Eckermann | 33/268 |
| 3,591,260 | 7/1971 | Harrington et al. | 356/141 |
| 3,713,740 | 1/1973 | Lillestrand et al. | 356/152 |
| 3,717,413 | 2/1973 | Kubo et al. | 356/152 |

Primary Examiner—Maynard R. Wilbur
Assistant Examiner—S. C. Buczinski
Attorney, Agent, or Firm—Joseph E. Rusz; Henry S. Miller

[57] ABSTRACT

Stellar events are timed through a lens system and reticle by a photomultiplier tube, times are compared and a difference factor computed, the difference factor is implemented to move the lens system, reticle and photomultiplier until times are equal, verifying the location of a line on the reticle to be on the meridian.

4 Claims, 5 Drawing Figures

MEANS AND METHOD FOR DETERMINING MERIDIAN LOCATION AND AZIMUTH

BACKGROUND OF THE INVENTION

This invention relates generally to an apparatus and method for determining meridian location and azimuth and more particularly to a passive device using time matched photo-electric signals of star passages.

Position-fixing by means of star observations is not new in the art; however, known devices and techniques are time consuming, utilize delicate equipment and involve the use of the personal equation.

The most time consuming of prior art devices is the theodolite which provides relatively accurate position information. However, the theodolite requires a long measurement interval and post-observation data reduction period. On the other hand, star trackers, while reducing the time element, require complex tracking equipment for automatic operation.

The best known instrument for position determination is the sextant.

Although the sextant is capable of providing a position fix with sufficient accuracy for surface navigation, the personal equation of the operator is a substantial factor in the accuracy and reliability of the instrument.

Hence, there is no currently available, accurate, rapid and convenient means for fixing a position on the earth surface.

SUMMARY OF THE INVENTION

The invention solves the short comings of prior art instruments by providing a means and method for determining meridian location and azimuth. The invention is light weight, easily operated, provides accurate information in the shortest possible time and is completely automatic. These features are the purposes and objects of this invention.

The apparatus comprises an optical system mounted on a rotatable disk, being adjustable in elevations. The lens portion of the system directs stellar light through a reticle into a photomultiplier tube. The photomultiplier is connected to a small computer which stores the output from the photomultiplier as the stars cross the reticle pattern. The computer records the time interval of each stellar event from the photomultiplier signal and compares the signals, determining the difference and a ratio factor.

The reticle design is based upon the optical principle that a reticle consisting of straight lines emanating from the center field of view and separated by equally inscribed angles, will be subject to star crossings evenly spaced in time only when the center line of the reticle is vertically aligned with the observers meridian. Hence, using the appropriate reticle, when the difference signal as determined by the computer is zero, a designated line on the reticle is on the observers meridian.

Add to the system as thus disclosed a means for determining a ratio between the times measured and feed this ratio back to an electromechanical driving system for rotating the disk on which the optical system is mounted, the invention is complete.

DESCRIPTION OF THE PREFERRED EMBODIMENT

Figure 2:
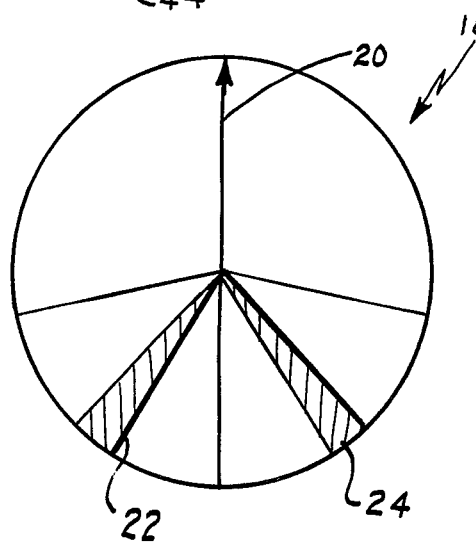
FIG. 2 is a representation of an alternative optical reticle that may be utilized in the invention.
Figure 1:
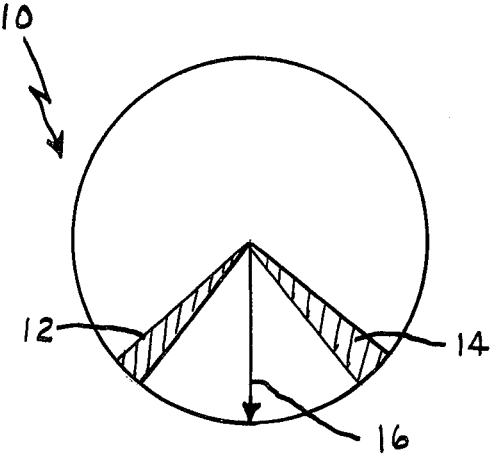
FIG. 1 is a representation of an optical reticle that may be utilized in the invention.

Referring now to FIG. 1, there is shown a reticle generally at 10. The reticle is opaque except for two equal areas 12, 14. The centerline 16 bisects the angle between the clear areas 12 and 14. In FIG. 2, the reticle is shown generally at 18 and is opaque except for the centerline 20 and the equal areas shown at 22 and 24. The centerline bisects the angle between the clear areas.

Figure 3:
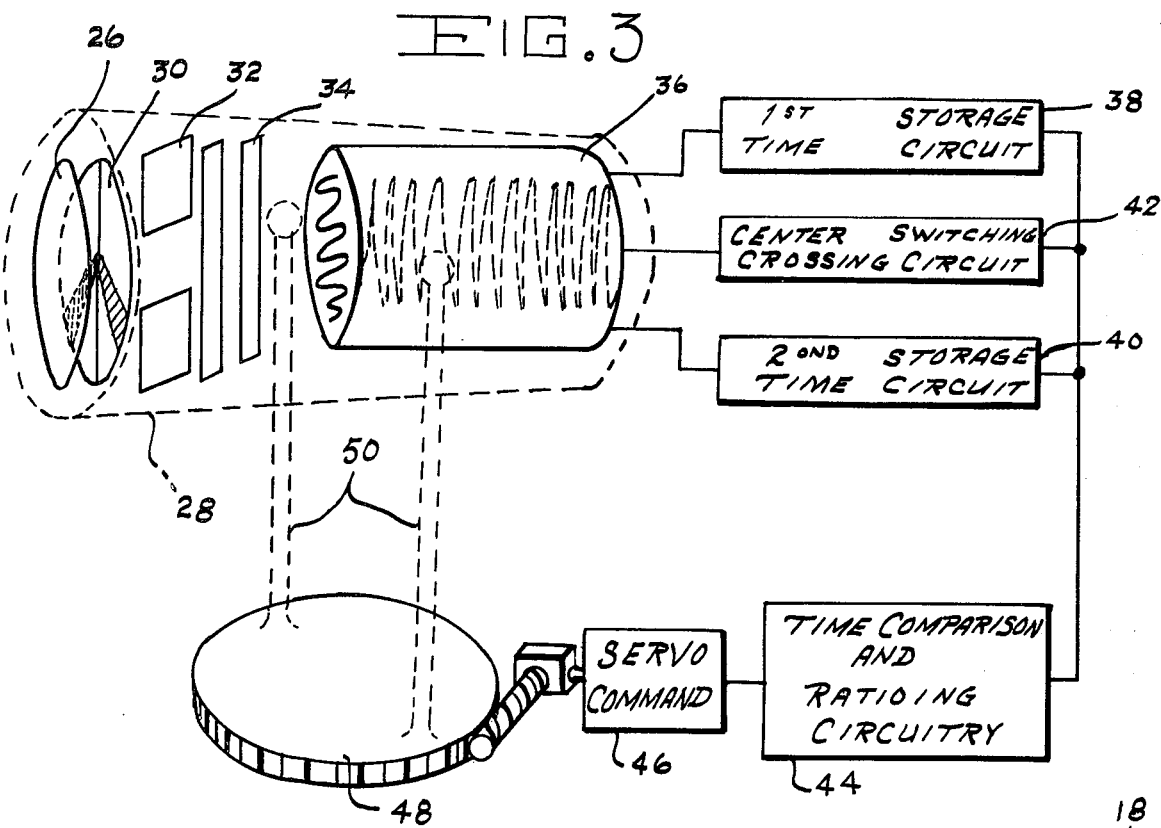
FIG. 3 is a block diagram of the system of the invention.

The system of the invention is shown in FIG. 3. A lens system, represented by the single lens 26 is held in a housing 28. In the focal plane of the lens system is a reticle 30. Adjacent to the reticle are a pair of shutters 32, 34. The shutters are manually operated and referred to as vertical shutter (32) which will permit the reticle to follow one specific star across the field of view. The remaining shutter (34) is referred to as the horizontal shutter and will permit a group of stars to be observed first by one reticle, then by closing off that reticle, letting the other reticle line observe the same stars, without any future interference by succeeding stars.

Following the shutters is the single photomultiplier 36, which amplifies the signal created by light striking the screen 35 and shown in the figure by line 37. The output leads of the photomultiplier are connected to the first and second time storage circuits (38, 40) and the center crossing switching circuit 42. The signals are then fed to the computer time comparison and ratio determination circuit 44. Output from the computer is directed to the servo command and driver 46 which turns the horizontal circle 48 in the appropriate direction. The instrument mounted in the housing 28 is secured to the circle by means of a mounting 50 which allows for manual elevation of instrument.

In operation, the system using the reticle shown in FIG. 1, a star crossing one of the clear areas in the reticle pattern would be detected by the photomultiplier. The time required to cross the reticle area would be measured and stored. Then, as the same star crosses the second clear area in the reticle the time of crossing would be measured and stored. The data storage circuits will match the crossing times from the reticles. If the times are equal the center line bisecting the angle between the areas is positioned on the meridian.

Alternatively, if the time of crossing between the first and second measurement varies, the unequal time lengths will be ratioed. This will activate the servo-driven horizontal circle bearing the instrument, turning the instrument to correct for the difference. Several separate measurements could be required. In the process of error correction, the horizontal circle will be automatically rotated ½ the difference between the two time lengths, expressed as a ratio, and in the direction of the smaller time length. For example, if a star required ⅓ more time to cross the last of the reticle lines than it did the first, matching circuitry would send a driving signal to a motor to realign the horizontal plane of the reticle by an amount equal to 1/6 of the central angle between the pairs of the inscribed reticles.

In an alternative embodiment, where the system shown in FIG. 3 utilizes the reticle pattern of FIG. 2, the significant distinction lies in the clear center line designated as C. With this pattern star crossing times are recorded at A, B, C, D and E. The mean times of the event crossing the AB and DE intervals are computed and then the intervals between these times and the time of the center of crossing at C are compared. The ratio of these intervals (rather than the AB, DE intervals) can then be used as the comparison numbers which should be "forced" to equality for meridian location.

Figure 4:
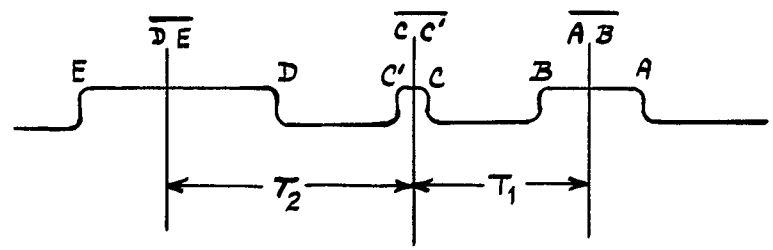
FIG. 4 is a graphic representation of the output signal of the invention.
Figure 5:
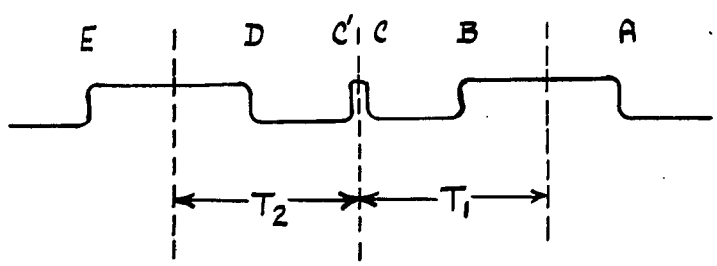
FIG. 5 is another graphic representation of the output signal of the invention.

Information from such an observation would look as in FIG. 4. (CC' is labelled to indicate that there is a finite width to this clear line.) Then the electronic circuitry, after computing the relative time for passage between AB or center of AB to center of CC' versus center of CC' to center of DE, will steer the device in the direction of the shorter time. This process will be repeated until an osciloscope trace or oscillograph record of the event would look as in FIG. 5.

Having thus described my invention, the following claims are made.

1. A system for determining meridian location comprising: a means for observing stellar events; a rotatable support means adopted to receive the stellar event observing means; means for selectively rotating said support means in a level plane; means connected to the observing means for timing, and recording sequential intervals of the passage of a stellar object relative to at least two fixed apertures in said observing means; means for determining a ratio between timed sequential intervals; means for converting the ratio into an electrical signal; and means connected to the support rotating means for rotating said support until determined ratios for subsequent sequential stellar events reach a minimum.

2. A system for determining meridian location according to claim 1 wherein said means for observing stellar events comprises: a cylindrically shaped housing; a lens system mounted at one end of the housing; a photomultiplier mounted at the opposite end of the housing; a reticle means mounted in the housing proximate to the lens system, and shutter means mounted in the housing proximate the photomultiplier means.

3. A system for determining meridian location according to claim 2 wherein said reticle means is circular and includes an opaque surface having two pair of spaced radial lines originating at the center point of the reticle and extending to the perimeter of the reticle wherein the areas between each pair of radial lines are equal, non-opaque and light transmitting to define apertures, and wherein a non-opaque center line extends from the center of the reticle to the perimeter and is so positioned as to be between the two pairs of radial lines and equidistant from each.

4. A system for determining meridian location according to claim 2 wherein said reticle means is circular and includes an opaque surface having two pair of spaced radial lines originating at the center point of the reticle and extending to the perimeter of the reticle wherein the areas between each pair of radial lines is equal, non-opaque and light transmitting to define apertures; and wherein there is a center line having a finite width and being non-opaque and light transmitting extending across the diameter of the reticle and being so positioned as to extend between the two pairs of radial lines and equidistant from each.

* * * * *